J. F. WRIGHT.

WRENCH.

APPLICATION FILED SEPT. 11, 1911.

Reissued Nov. 28, 1911. 13,328.

Witnesses

Francis R. Stanton

John Herr

Inventor

James F. Wright

By Bonney & Mostick his Attorneys

COLUMBIA PLANOGRAPH CO., WASHINGTON, D. C.

UNITED STATES PATENT OFFICE.

JAMES F. WRIGHT, OF CANTON, OHIO.

WRENCH.

13,328. Specification of Reissued Letters Patent. Reissued Nov. 28, 1911.

Original No. 981,234, dated January 10, 1911, Serial No. 585,972. Application for reissue filed September 11, 1911. Serial No. 648,761.

*To all whom it may concern:*

Be it known that I, JAMES F. WRIGHT, a citizen of the United States, and a resident of Canton, in the county of Stark and State of Ohio, have invented a new and useful Improvement in Wrenches, of which the following is a full, clear, and exact description.

The object of the present invention is to provide an improved wrench which is simple in construction and durable.

Another object is to so construct the parts that the wrench can be quickly adjusted so as to be applied to different sized pipes or objects upon which the wrench is to be applied.

Still another object is to so construct the wrench that when the same has been adjusted or more specifically the jaws adjusted they will be firmly held against relative movement when strain is brought upon the jaws.

Another object is to so arrange the parts that when strain or pressure is brought the strain will be so distributed that it will come upon the stronger parts of the wrench, thereby preventing any springing or bending of the wrench proper.

These objects together with other objects readily apparent to those skilled in the art. I attain by the construction illustrated in the accompanying drawing, although my invention may be embodied in a variety of other mechanical forms, the construction illustrated being chosen by way of example.

Figure 1:
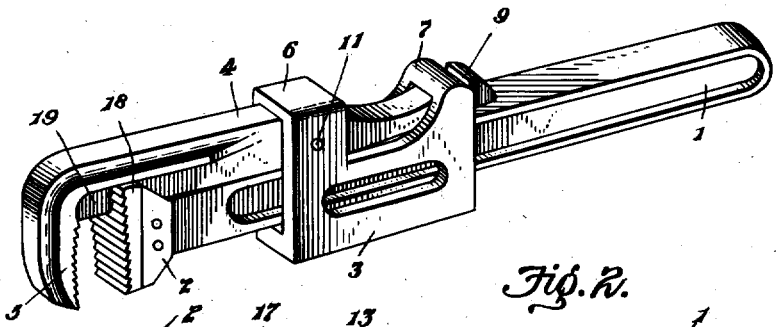
Figure 2:
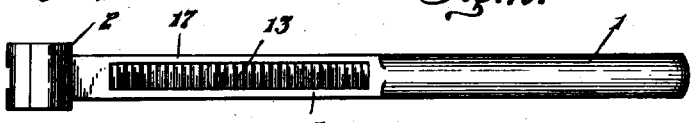
Figure 3:
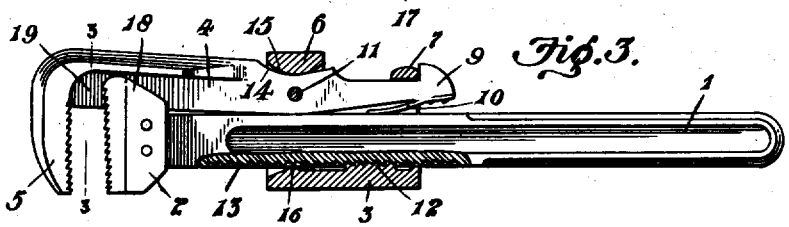
Figure 4:
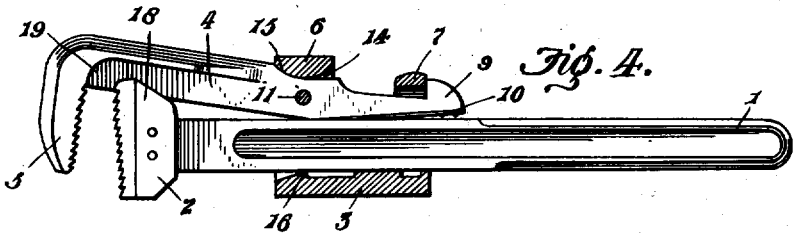
Figure 5:
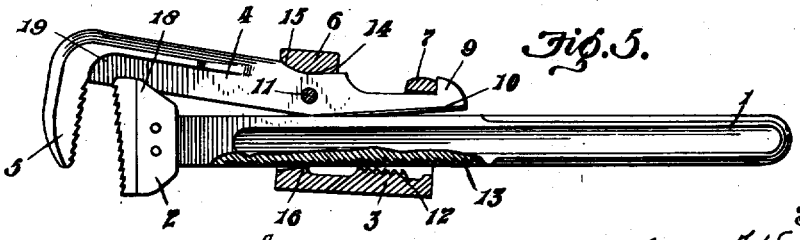
Figure 6:
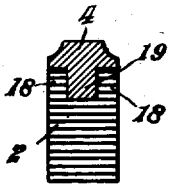

Figure 1 is a perspective view of the improved wrench. Fig. 2 is a bottom or underside view of the combined shank and handle. Fig. 3 is a vertical section of the yoke showing the different parts properly connected and the jaws held or locked against relative movement. Fig. 4 is a similar view showing the jaw end of the combined rock arm or shank elevated with reference to the fixed jaw, shank and handle. Fig. 5 is a similar view to Figs. 3 and 4 except the yoke, the adjustable shank and rock-bar are rocked into position to permit sliding movement of the adjustable rock-bar and shank. Fig. 6 is a transverse section on line 3—3, Fig. 3.

Similar numerals of reference indicate corresponding parts in all the figures of the drawing.

In the accompanying drawing, 1 represents the combined shank and handle to which is attached in the usual manner the jaw 2. Upon the combined shank and handle 1 is slidably mounted the yoke 3, which yoke is for the purpose of assisting in holding in proper relative position the combined shank and handle 1 and the rock-bar and shank 4, which rock-bar and shank is provided with the jaw 5. The yoke 3 is provided with the loop or strap portions 6 and 7, said loop or strap portions being spaced from each other substantially as illustrated in the drawing. The loop or strap portions 6 and 7 are for the purpose of holding the combined rock-bar and shank 4 in proper alinement with the combined handle and shank 1.

For the purpose of providing means for moving the yoke 3 and the rock-bar 4 in unison back and forth upon the combined shank and handle 1, said rock-bar is pivotally connected to the loop or strap portion 6 of the yoke 3. The rock-bar 4 is extended rearward through and under the loop or strap 7 and the end adjacent to the loop 7 provided with the shoulder 9, the face of which shoulder is designed and calculated to come in contact with the loop or strap 7 when strain is brought upon the jaws 2 and 5. Between the rock-bar 4 and the combined handle and shank 1 is located the spring 10, which spring may be attached to the rock-bar 4 and is for the purpose of normally holding the rear end of the rock-bar 4 up and away from the top face of the handle or shank 1 and also holding the rear end or portion of the yoke 3 up so that its bottom rear end or portion will come in engagement and contact with the underside of the combined handle and shank 1. When it is desired to adjust the jaws of the wrench the yoke 3 is rocked as hereinafter described. As the rear portion of the yoke 3 is moved downward by pressure the rear bottom of said yoke is moved away from the handle or shank 1 or in the position illustrated in Fig. 5 and when in such position the teeth 12 formed upon the upper face of the bottom of the yoke 3 are disengaged from the teeth 13 formed in the bottom or underside of the handle or shank 1, thereby permitting the handle or shank to be moved longitudinally in either direction with reference to the yoke 3 and the rock-bar 4. In some instances it is desirable to rock the bar 4 independent of the yoke 3 and when so rocked the yoke 3 is not released as against sliding movement upon the handle or shank 1, but when it is desired to release the yoke, said yoke must be rocked upon its pivotal point and brought into the position illustrated in Fig. 5.

For the purpose of providing for the rocking movement of the rock-bar and shank 1, the rear portion of said rock bar or that portion of the rock-bar at the rear of the pivot 11 is inclined upward so as to provide room to allow the rear portion to be brought down to the upper face of the combined shank and handle 1. The rock-bar 4 should be so constructed that that portion of the rock-bar just below the pivot 11 will come in contact with the upper face of the combined handle and shank 1 so that the strain may be partially removed from the pivot 11.

For the purpose of providing or allowing for the rocking movement of the yoke 3 and the rock-bar 4 either in unison or independently, said rock-bar is provided with the concave recess 14, into which recess is seated the convex face 15 formed upon the loop or strap 6.

For the purpose of removing the strain from the pivot or more specifically the rivet 11 the shoulder 9 is provided, which shoulder is so located that it will come in contact with the loop or strap 7, which loop or strap 7 is formed integral with the yoke 3 and as strain is brought upon the jaws 2 and 5 the shoulder 9 will come in contact with the loop 7, thereby removing the strain from the rock-bar pin to the heavier and better adapted part to carry the strain, to wit: the yoke 3, owing to the fact that the strain will be longitudinal with or in alinement with the rock-bar 4.

For the purpose of preventing any binding action of the yoke 3 during the time it is rocked or moved to its different positions, said yoke is provided with the contact rib 16, which rib comes upon the smooth surfaces 17 located upon opposite sides of the teeth 13.

In order that there may be no accidental displacement of the rock-bar 4 with reference to the handle or shank 1 during the time the wrench is being adjusted or at any other time the jaw 2 is provided with the upward extended flanges 18, which flanges are spaced a distance equal to the thickness of the portion of the flange 19 of the rock-bar 4, which portion or flange 19 is located between the flanges 18 as best illustrated in Fig. 6.

It will be understood that by providing means whereby the rock-bar 4 can be rocked upon its pivotal point independent of the yoke that the jaws can be released or freed from the pipe upon which they are seated without releasing the yoke 3 from the shank or handle 1. This is in some instances desirable, owing to the fact that the jaws are easily and quickly released without interfering in any way with the fixed adjustment of the jaws 2 and 5. By providing means for rocking the yoke 3 and the rock-bar 4 simultaneously when so desired the jaws can be quickly adjusted to and from each other, thereby providing means for bringing the jaws into position for different sized pipes upon which the wrench is to be applied, or other objects. When the yoke 3 and the rock-bar 4 are rocked simultaneously the rib 16 forms a fulcrum for the rocking movement of the yoke 3, thereby causing the loop or strap 6 to follow the arc of a circle, but when the rock-bar 4 is rocked independently it moves upon the rivet 11 and by providing the concave recess 14 and seating the convex face 15 formed upon the strap 6 provision is made for the independent rocking of the rock-bar 4 and also the rocking or oscillating movement of the yoke 3.

Having fully described my invention, what I claim as new and desire to secure by Letters Patent is:

1. In a wrench of the class described, the combination of a combined handle and shank provided with a jaw, a rock-bar provided with a jaw and a shoulder, said jaw and shoulder located at the ends of the rock-bar, the face of the rock-bar adjacent to the shoulder being beveled to a point below the connection between the rock-bar and a yoke, whereby said face will be in contact with the upper surface of the shank irrespective of its tilted position, a yoke connected to the rock-bar and adapted to embrace said rock-bar and shank, said yoke provided with spaced loops, one of said loops provided with a convex face and the rock-bar provided with a recess and the convex face adapted to be seated in the recess, the shoulder on the rock-bar engaging the other loop irrespective of the position to which said rock-bar is tilted, a spring interposed between the rock-bar and the handle shank, and means for holding the yoke and rock-bar against longitudinal movement upon the shank substantially as and for the purpose specified.

2. In a wrench of the class described, the combination of a combined handle and shank provided with a fixed jaw, a yoke slidably mounted upon said handle and shank, said yoke provided with spaced loops and a rib adapted for contact with the under side of the shank, a rock-bar provided with a jaw, said rock-bar pivotally mounted in the yoke and adapted to move upon its pivotal point independently of the pivotal movement of the yoke, said rock-bar provided with a shoulder, said shoulder adapted at all times to engage one of the loops of the yoke, the lower face of the rock-bar from a point below the pivot to the shoulder being beveled, whereby it will contact with the upper surface of the shank irrespective of its tilted position, a spring interposed between the rock-bar and shank and means for holding the rock-bar and yoke against longitudinal movement upon the shank substantially as and for the purpose specified.

3. In a wrench of the class described, the combination of a handle and shank, said shank provided with a jaw, a rock-bar provided with a jaw, said rock-bar provided with a recess upon its upper face, a yoke provided with spaced loops, one of the loops adapted for contact with the recess formed in the rock-bar, said yoke and rock-bar operatively connected together and each adapted to rock independently of the other, the rock-bar provided with a shoulder at all times in engagement with one of the loops of the yoke, and a spring interposed between the shank and rock-bar substantially as and for the purpose specified.

4. In a wrench of the class described, the combination of a handle and shank, said shank provided with a jaw, a rock-bar provided with a jaw, said rock-bar provided with a recess upon its upper face, a yoke provided with spaced loops, one of the loops adapted for contact with the recess formed in the rock-bar, said loop and rock-bar pivotally connected together and each adapted to rock independently of the other, the rock-bar provided with a shoulder at all times in engagement with one of the loops of the yoke, the lower face of the rock-bar from a point below the pivot to the shoulder being beveled, whereby it will contact with the upper surface of the shank irrespective of its tilted position, a spring interposed between the shank and rock-bar and means for holding the yoke and rock-bar against longitudinal movement upon the shank substantially as and for the purpose specified.

5. In a wrench of the class described, the combination of a handle and shank and a rock-bar, said handle and shank provided with a jaw, a yoke provided with spaced loops and a rib, said rib adapted to contact with the shank, said rock-bar and yoke operatively connected together and each adapted to rock upon the shank, means for preventing longitudinal movement of the yoke and rock-bar upon the shank and a shoulder located upon the rock-bar and at all times in contact with one of the loops of the yoke and means for normally holding the shoulder in engagement with said loop substantially as and for the purpose specified.

6. In a wrench of the class described, the combination of a combined handle and shank provided with a jaw, a rock-bar provided with a jaw coöperating with the first-said jaw, and a yoke slidably mounted on said handle and shank, said yoke embracing both the handle and shank and the rock-bar, said rock-bar being shaped and fitted to rock relatively to and in bearing contact against the said handle and shank and also relatively to and against the said yoke while remaining in substantially close contact with both and means for preventing longitudinal movement of the yoke upon the shank.

7. In a wrench of the class described, the combination of a combined handle and shank provided with a jaw, a rock-bar provided with a jaw coöperating with the first-said jaw, and a yoke slidably mounted on the said handle and shank, said yoke embracing both the handle and shank and the rock-bar, said rock-bar being shaped and fitted to rock relatively to the said handle and shank and also relatively to the said yoke while remaining in substantially close contact with both and means for preventing longitudinal movement of the yoke upon the shank, said rock-bar being provided with a shoulder for engaging the said yoke for resisting the strain from the jaws.

In testimony that I claim the above, I have hereunto subscribed my name in the presence of two witnesses.

JAMES F. WRIGHT.

Witnesses:
HAROLD BINNEY,
A. PSCHIERER.

Copies of this patent may be obtained for five cents each, by addressing the "Commissioner of Patents, Washington, D. C."